United States Patent [19]

Wu

[11] Patent Number: 5,487,286
[45] Date of Patent: Jan. 30, 1996

[54] LOCK ASSEMBLY FOR ANTI-THEFT DEVICE FOR VEHICLE

[76] Inventor: Ping-Hua Wu, No. 55, Cai Shen 2Rd, Kaohsiung, Taiwan

[21] Appl. No.: 190,418

[22] Filed: Feb. 2, 1994

[51] Int. Cl.⁶ .................................................. B60R 25/06
[52] U.S. Cl. .................................................. 70/52; 70/247
[58] Field of Search ..................... 70/247, 38 A, 70/52, 201–203, 212, 448, 370, 371, DIG. 56, 39; 403/375, 380, 363, 336, 353, 24; 248/225.1, 223.4, 307

[56] References Cited

U.S. PATENT DOCUMENTS

| | | | |
|---|---|---|---|
| 1,835,709 | 12/1931 | Jacobi | 70/52 |
| 3,596,861 | 8/1971 | Baldini | 248/223.4 |
| 4,693,099 | 9/1987 | Cykman | 70/247 |
| 4,718,259 | 1/1988 | Applebaum | 70/52 |
| 5,228,320 | 7/1993 | Liou | 70/247 |
| 5,230,231 | 7/1993 | Liou | 70/52 |
| 5,295,375 | 3/1994 | Jonas | 70/247 |
| 5,372,019 | 12/1994 | Hsaio | 70/39 |

FOREIGN PATENT DOCUMENTS 2253197  2/1992  United Kingdom ............ 70/247

*Primary Examiner*—Steven N. Meyers
*Assistant Examiner*—Gary Estremsky
*Attorney, Agent, or Firm*—Alfred Lei

[57] ABSTRACT

A lock assembly for an anti-theft device for a vehicle includes a lock having a base and a box fixed on the lock, the base includes four depressions formed in the upper surface, a casing is engaged on the box and has four ears engaged in the depressions of the base, a housing is engaged on the base and includes two flanges for engaging with the ears so as to retain the ears within the depressions, and a covering is engaged on the casing and the housing for retaining the lock in the housing.

1 Claim, 5 Drawing Sheets

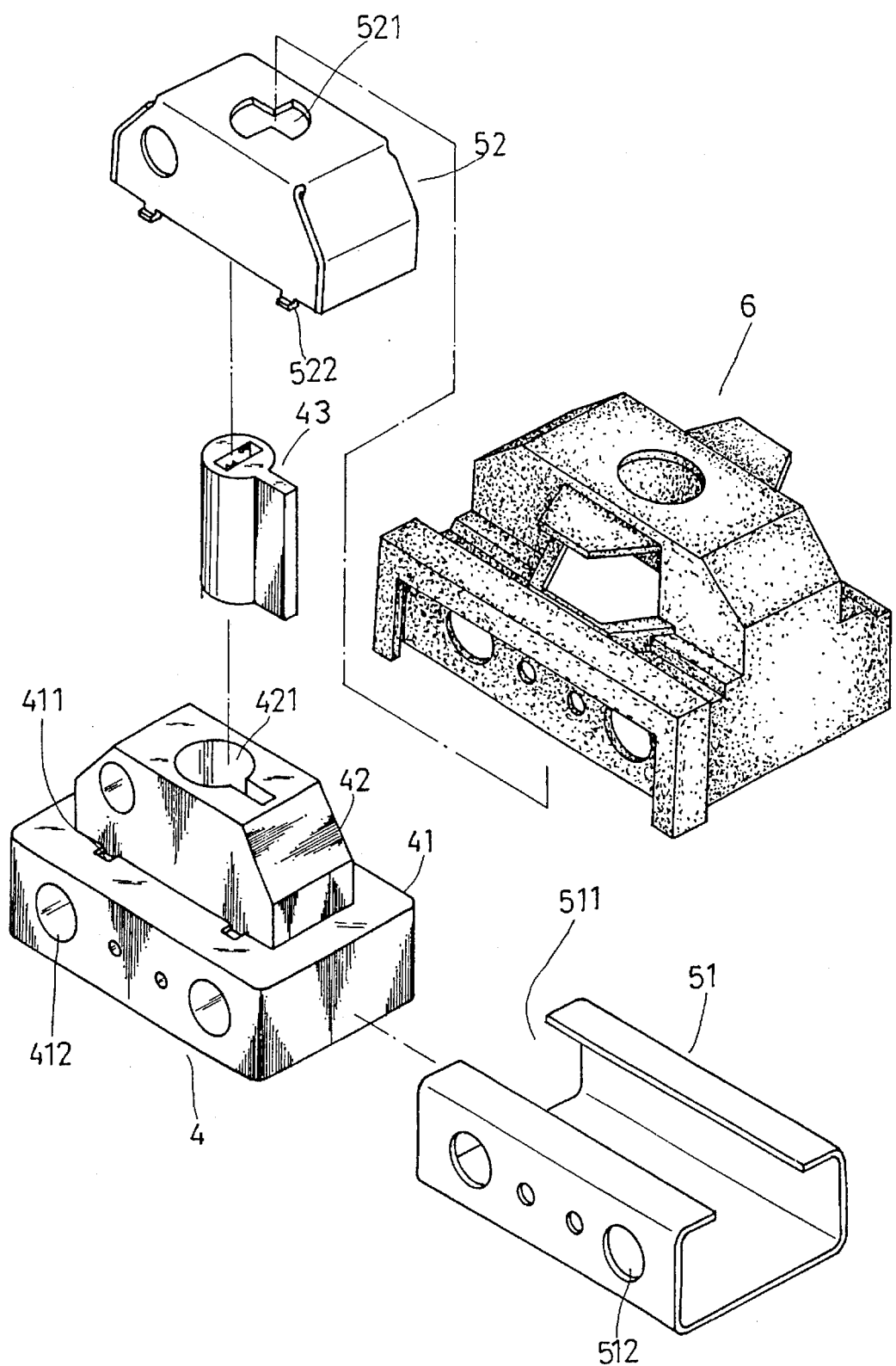
FIG:2

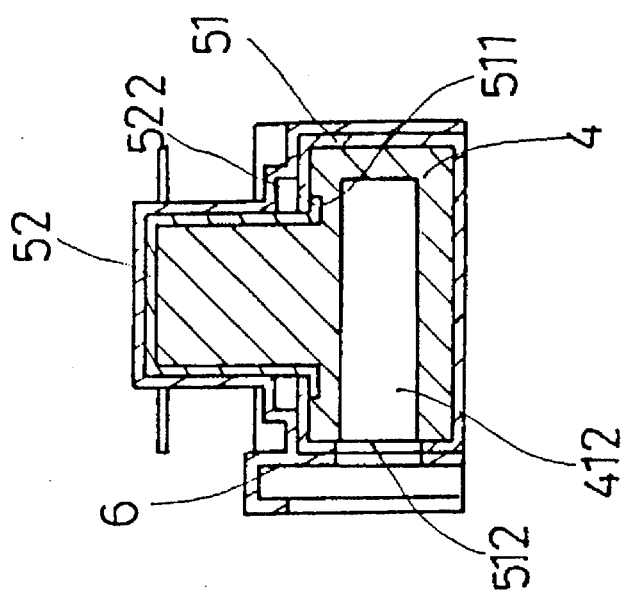
FIG:4
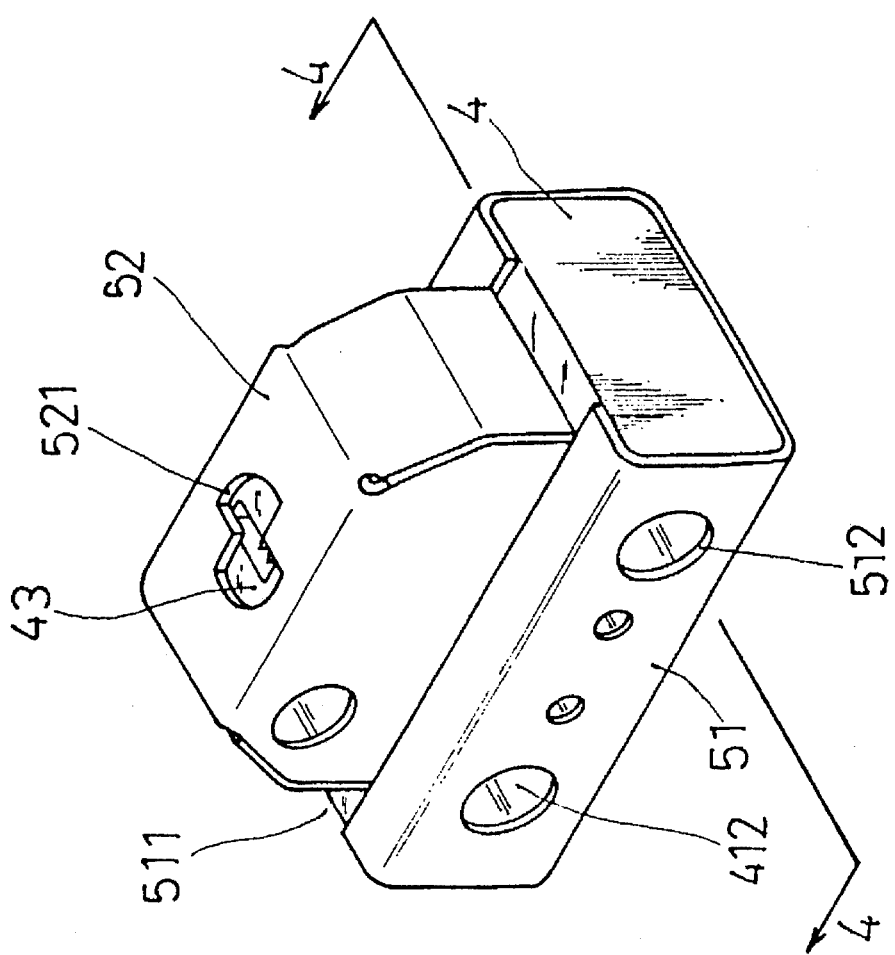
FIG:3

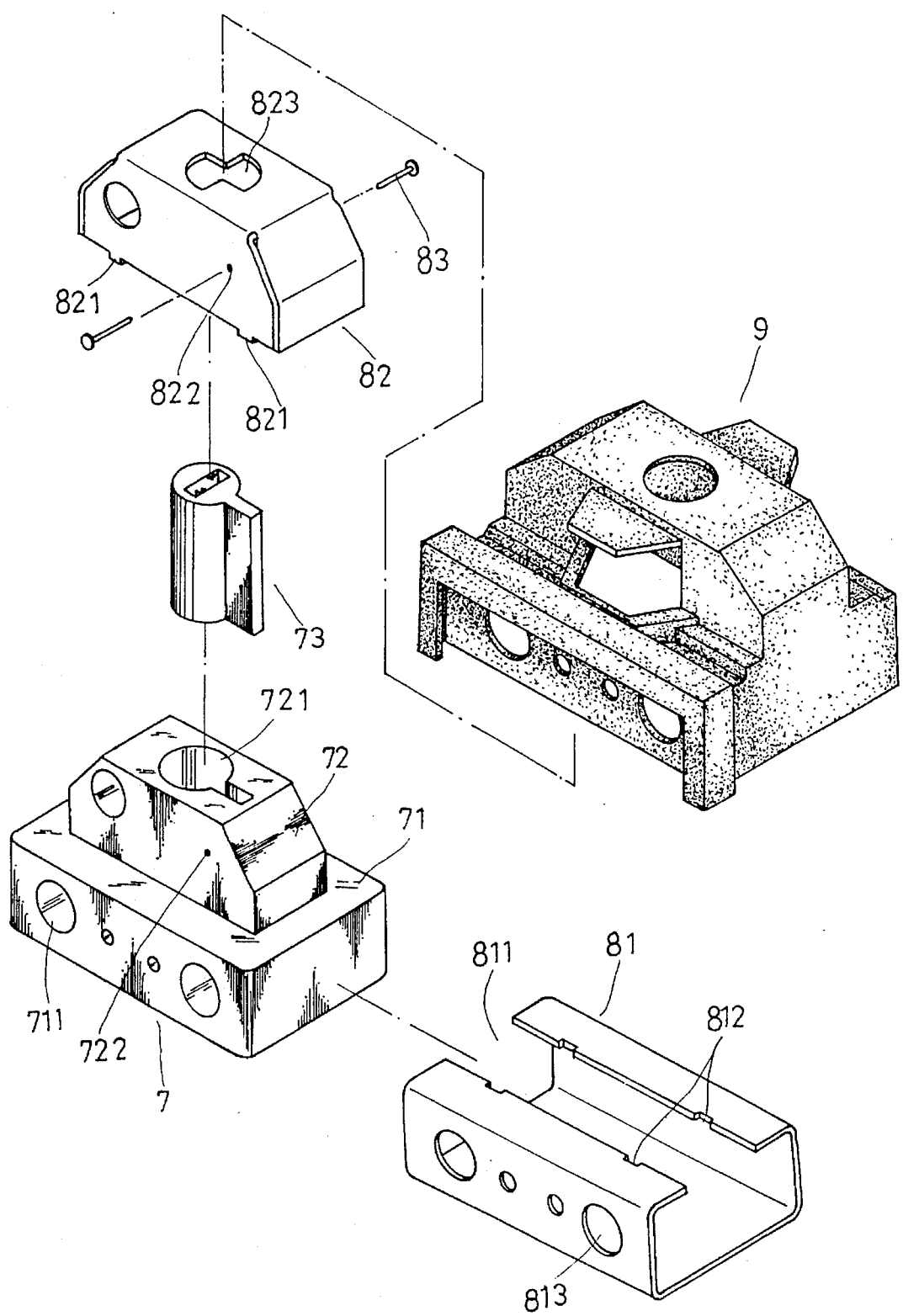
FIG:5

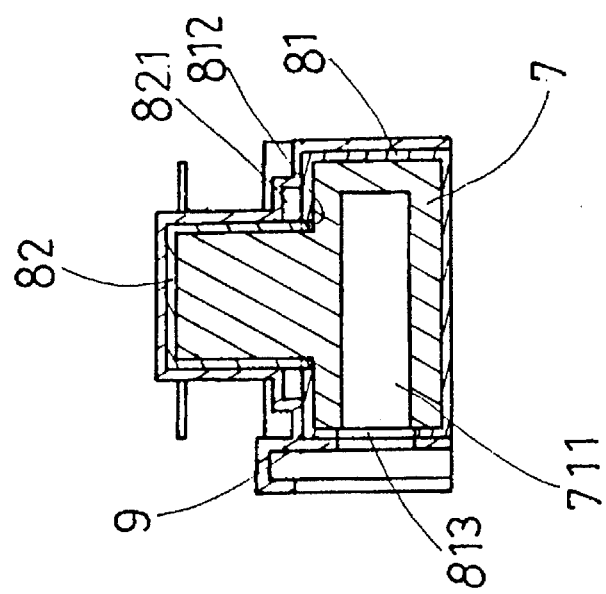
FIG:7
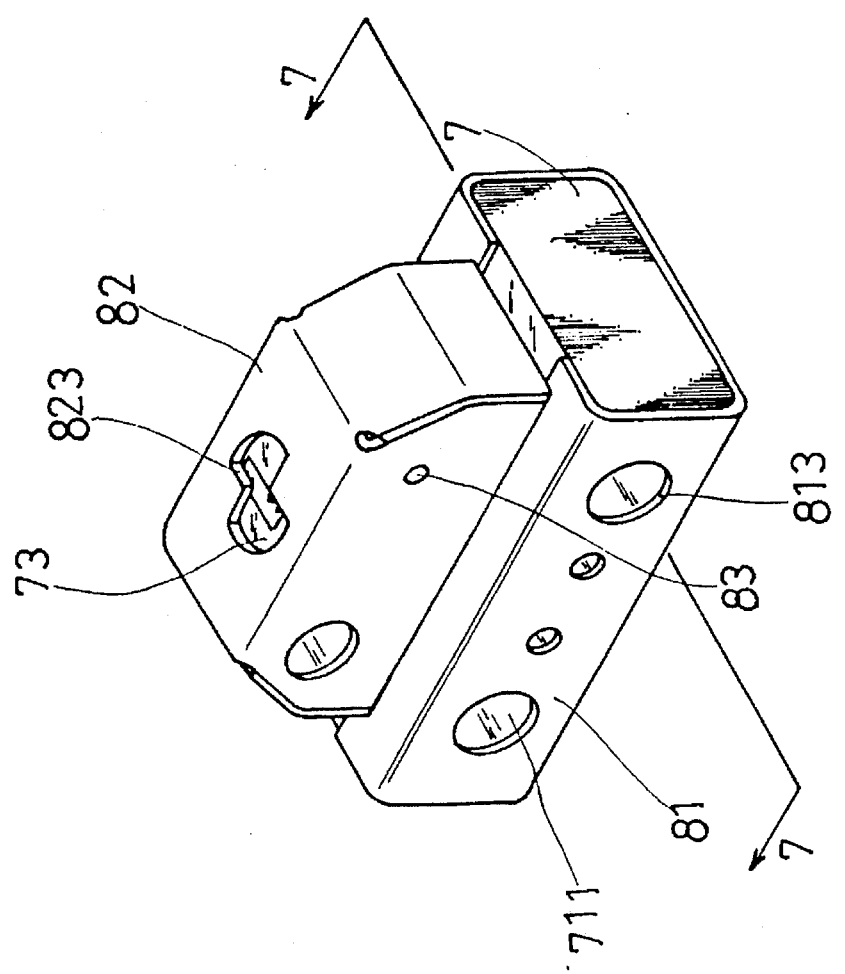
FIG:6

5,487,286

LOCK ASSEMBLY FOR ANTI-THEFT DEVICE FOR VEHICLE

BACKGROUND OF THE INVENTION

1. Field of the Invention

The present invention relates to a lock assembly, and more particularly to a lock assembly for an anti-theft device for a vehicle.

2. Description of the Prior Art

Typical anti-theft devices for vehicles comprise a lock assembly having a protective covering, as shown in FIG. 1, a typical lock assembly is illustrated and comprises a casing 21 for receiving a lock 1, rivets 211 fixing the lock to the casing, a wall member 22 fixed on the casing 21 and communicated with the interior of the casing 21 by an opening 212 formed in the casing 21, a board 23 fixed to the wall member 22, a cap 24 fixed to the top of the wall member 22 by rivets 221, a core 11 disposed in the wall member 22 and engaged with the lock 1, and a housing 3 engaged on the wall member and the casing 21 for covering the same.

In such a lock assembly, the board 23 is required to be welded to the wall member 22, the casing 21 is required to be processed with a welding process when manufactured, in addition, a number of rivets or pins are required to fix the parts together, such that the configuration of the assembly is not good for assembling purposes.

The present invention has arisen to mitigate and/or obviate the afore-described disadvantages of the conventional anti-theft devices for vehicles.

SUMMARY OF THE INVENTION

The primary objective of the present invention is to provide a lock assembly for vehicles in which the assembly has a configuration which is excellent for assembling purposes.

In accordance with one aspect of the invention, there is provided a lock assembly for an anti-theft device for a vehicle comprising a lock body including a base for engaging with a pair of shanks, at least two depressions formed on top of the base, a box secured on top of the lock body and including an orifice formed therein for receiving a core, a casing engaged on the box and including at least two ears engaged in the depressions of the base, a housing including two flanges having a slot formed therebetween for engaging with the casing the flanges engaging with the ears so as to retain the ears within the depressions; and a covering engaged on the casing and the housing for retaining the lock body in the housing.

In another lock assembly, at least two protrusions are extended downward from the casing and engaged with at least two notches formed in the housing.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is an exploded view of a lock assembly in accordance with the present invention FIG. 3 is a perspective view illustrating part of the lock assembly, in which the covering is removed;

FIG. 4 is a cross sectional view taken along lines 4—4 of FIG. 3;

FIG. 5 is an exploded view of a lock assembly illustrating another application of the present invention;

FIG. 6 is a perspective view illustrating part of the lock assembly as shown in FIG. 5, in which the covering is removed; and FIG. 7 is a cross sectional view taken along lines 7—7 of FIG. 6.

DETAILED DESCRIPTION OF THE PREFERRED EMBODIMENT

Figure 1:
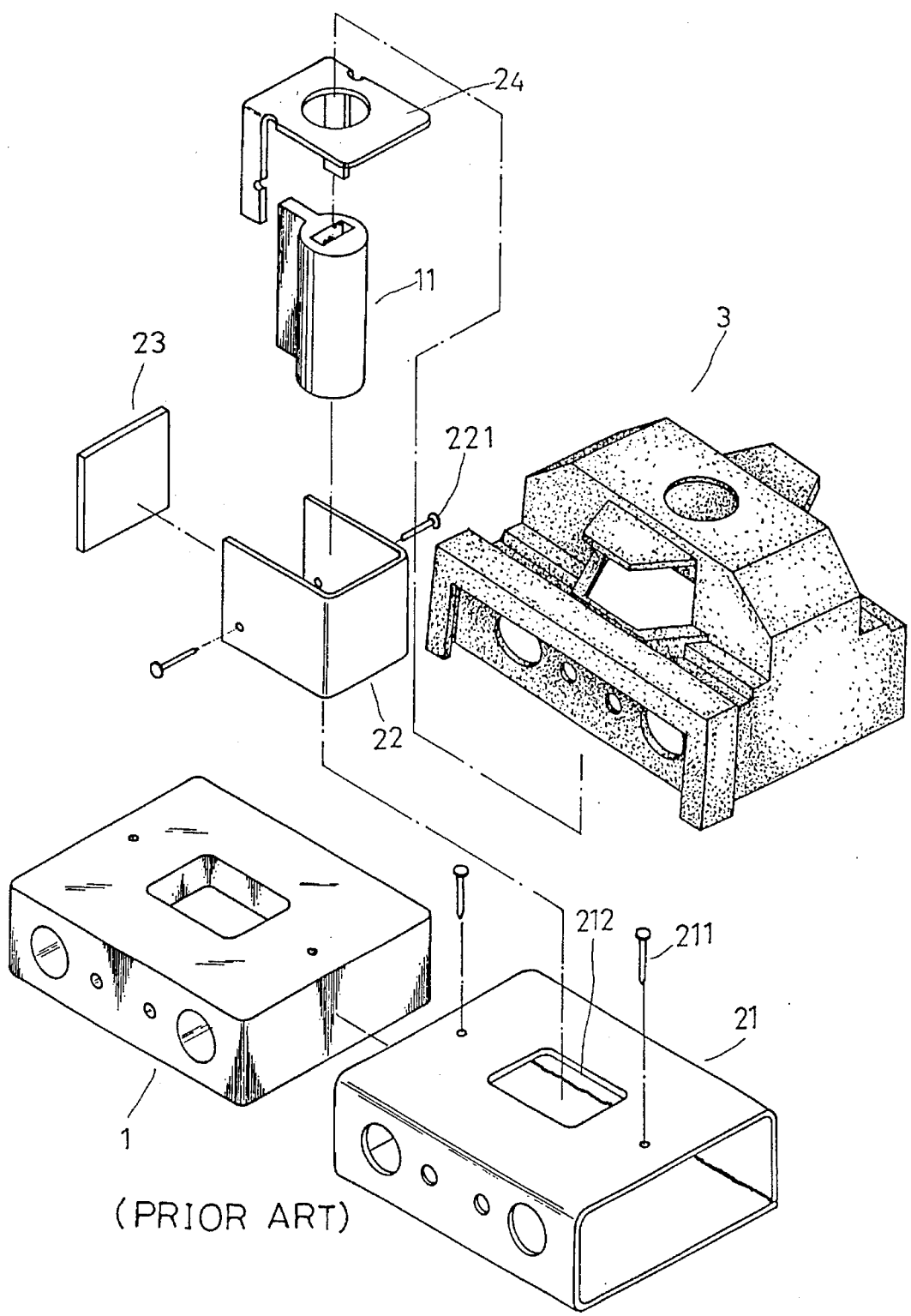
FIG. 1 is an exploded view of a conventional lock assembly.

Referring to the drawings, and initially to FIGS. 2 to 4, a lock assembly comprises a lock body 4 including a base 41 having four depressions 411 formed in the upper surface and having two openings 412 formed therein for receiving a pair of shanks of a lock, a box 42 fixed on top of the base 41 and having an orifice 421 formed therein for receiving a core 43 of the lock, a casing 52 engaged on the box 42 and including an orifice 521 aligned with the core 43 such that a key may be engaged with the core 43 via the orifice 521, the casing 52 including four ears 522 provided in the lower portion thereof for engaging with the depressions 411 of the lock body 4, a housing 51 having a configuration suitable for receiving the base 41 of the lock body 4 and including two flanges 510 having a slot 511 formed therebetween for engaging with casing 52, the ears 522 of the casing 52 being retained in the depressions 411 by the flanges 510, and the housing 51 including two apertures 512 aligned with the openings 412 for engaging with the shanks of the lock; and a covering 6 is engaged on the casing 52 and the housing 51 for covering the same.

It is to be noted that the casing 52 and the housing 51 can be made without any welding processes, and the casing 52 can be easily engaged with the housing 51 without any rivets, the lock body 4 can be retained in the housing 51 by the covering 6, such that the configuration of the lock assembly is excellent for assembling purposes.

Referring next to FIGS. 5 to 7, instead of the ears 522 as shown in FIGS. 2 to 4, four protrusions 821 are provided in a casing 82 which also includes an orifice 823 for engaging with a key, the casing further includes two holes 822 for engaging with two pin elements or rivets 83, a housing 81 receives the base 71 of a lock 7 and includes a slot 811 for engaging with the box 72 of the lock 7, the box 72 also includes an orifice 721 for receiving the core 73, and further includes a hole 722 for engaging with the rivets 83, the housing 81 includes two apertures 813 aligned with the openings 711 of the lock 7, and includes four notches 812 formed therein for engaging with the protrusions 821 of the casing 82, the casing 82 is fixed to the box 72 by rivets 83 such that the casing 82 will not be disengaged from the lock 7 and the lock 7 can be retained in the housing 81 by the covering 9.

The configuration as shown in FIGS. 5 to 7 can also be easily assembled, it is only required to engage the base 71 within the housing 81, engage the casing 82 on the box 72 and fix the casing 82 to the box 72 by rivets 83.

Accordingly, the lock assembly includes a configuration excellent for assembling purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lock assembly for an anti-theft device for a vehicle comprising a lock body including a base for engaging with a pair of shanks, said base having four planar side surfaces and a flat planar upper surface thereby forming a rectangular-shaped solid, at least two depressions formed on top of said base, a box secured on top of said lock body and including an orifice formed therein for receiving a core, said box comprising a substantially rectangular-shaped solid, smaller than said base, and having four side surfaces perpendicular to the upper surface of the base and a flat upper surface that is parallel to the upper surface of the base, the box being secured to the upper surface of the base leaving portions of the upper surface of the base exposed on either side of the box, said orifice having a substantially cylindrical shape, its axis being perpendicular to the upper surface of the box, said base having a depression on the exposed portion of the upper surface of the base on either side of the box, a casing engaged on said box and including at least two ears engaged in said depressions of said base, said casing having four sides and an upper surface perpendicular to the sides thereby forming a generally rectangular-shaped solid that is open on the bottom, defining an inner hollow portion, configured to closely enclose the exposed surfaces of said box in a nesting relation when placed over the box, said ears being on opposite sides of the casing and extending perpendicularly outward from the sides and parallel to the upper surface of the base, a housing including two flanges having a slot formed therebetween for engaging with said casing, said flanges engaging with said ears so as to retain said ears within said depressions, said housing comprising a substantially rectangular prism open on both ends and having a slot on the upper surface connecting the open ends to allow the housing, to be slid over the assembled base, the slot being substantially the same width as the casing but not as wide as the base thereby defining flanges parallel and on either side of the slot, thereby allowing the box, and casing to protrude through the slot with said flanges covering the exposed portions of the upper surface of the base on either side of the box and retaining the ears in the depressions, thereby encasing and retaining the base, box, and casing in a nesting relationship, and a covering engaged on said casing and said housing for retaining said lock body in said housing.

\* \* \* \* \*